(12) United States Patent
Boelling

(10) Patent No.: US 8,303,424 B2
(45) Date of Patent: Nov. 6, 2012

(54) SHOE HAVING A SPRING POSITION LIMITATION, OR TORSIONAL OSCILLATION DAMPER HAVING SUCH A SHOE

(75) Inventor: Jochen Boelling, Baden-Baden (DE)

(73) Assignee: BorgWarner Inc., Auburn Hills, MI (US)

( * ) Notice: Subject to any disclaimer, the term of this patent is extended or adjusted under 35 U.S.C. 154(b) by 294 days.

(21) Appl. No.: 12/598,970

(22) PCT Filed: Apr. 24, 2008

(86) PCT No.: PCT/EP2008/003300
§ 371 (c)(1),
(2), (4) Date: Nov. 5, 2009

(87) PCT Pub. No.: WO2008/138461
PCT Pub. Date: Nov. 20, 2008

(65) Prior Publication Data
US 2010/0133060 A1    Jun. 3, 2010

(30) Foreign Application Priority Data
May 14, 2007 (DE) .................... 10 2007 022 891

(51) Int. Cl.
*F16F 15/121* (2006.01)
(52) U.S. Cl. .................... 464/68.92; 192/205
(58) Field of Classification Search ............ 464/68.92, 464/68.9; 192/205, 213; 267/166, 168
See application file for complete search history.

(56) References Cited

U.S. PATENT DOCUMENTS

| | | | |
|---|---|---|---|
| 3,380,566 A * | 4/1968 | Cook | 192/213 |
| 5,038,906 A * | 8/1991 | Minbu | 192/205 |
| 5,784,928 A * | 7/1998 | Mokdad et al. | |
| 6,227,976 B1 * | 5/2001 | Rohs et al. | 464/68.9 |
| 6,962,533 B2 * | 11/2005 | Zottmann et al. | 464/68.92 |
| 7,297,064 B2 * | 11/2007 | Jackel et al. | 464/68.92 |
| 2011/0057404 A1 * | 3/2011 | Tuckey et al. | |

FOREIGN PATENT DOCUMENTS

| | | |
|---|---|---|
| DE | 35 28 662 A1 | 2/1987 |
| DE | 199 58 814 A1 | 6/2001 |
| DE | 10 2004 00687 A1 | 8/2004 |

* cited by examiner

*Primary Examiner* — Gregory Binda
*Assistant Examiner* — Matthieu Setliff
(74) *Attorney, Agent, or Firm* — Bliss McGlynn, P.C.

(57) ABSTRACT

A shoe mounts an outer spring defining a longitudinal direction and an inner spring arranged within the outer spring. The outer and inner springs define corresponding end sides of the outer and inner springs, and the shoe defines an end side of the shoe. A spring-position limitation limits the outer spring in its longitudinal direction and enables the inner spring to emerge at the end side of the shoe out of the outer spring. A driver primary element exerts a pressure on the inner spring as the driver approaches the outer and inner springs in a direction of the corresponding end sides of the outer and inner springs.

20 Claims, 5 Drawing Sheets

Figure 1:
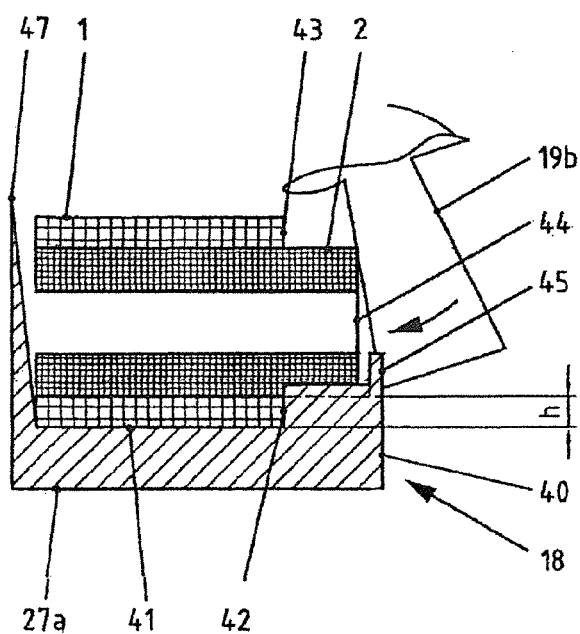

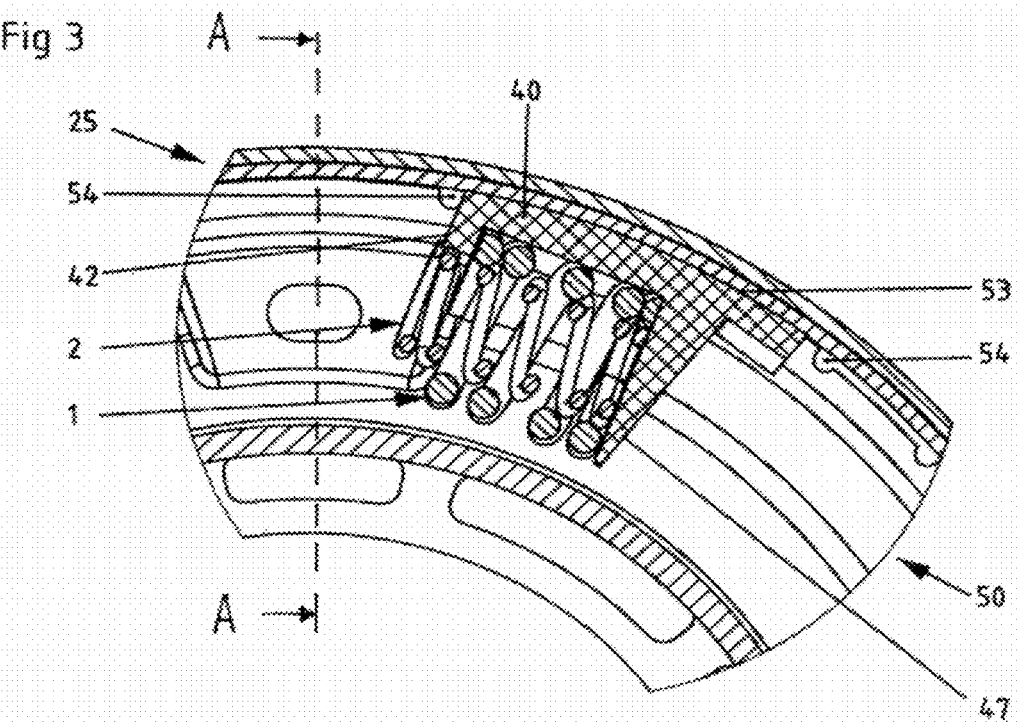
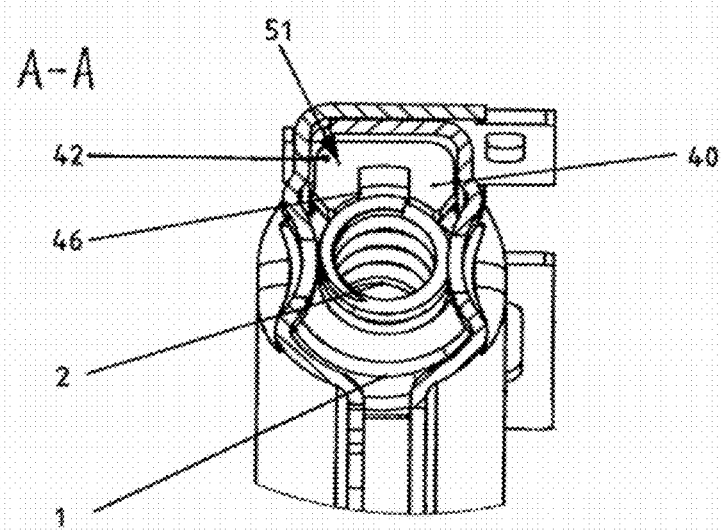

SHOE HAVING A SPRING POSITION LIMITATION, OR TORSIONAL OSCILLATION DAMPER HAVING SUCH A SHOE

CROSS-REFERENCE TO RELATED APPLICATIONS

This application claims benefit of PCT Patent Application PCT/EP2008/003300 entitled "SHOE HAVING A SPRING POSITION LIMITATION, OR TORSIONAL OSCILLATION DAMPER HAVING SUCH A SHOE" and filed on Apr. 24, 2008, which claims benefit of German Patent Application 10 2007 022 891.2 filed on May 14, 2007.

BACKGROUND OF INVENTION

1. Field of Invention

The invention relates to a shoe having a spring-position limitation for use, in particular, in a torsional-vibration damper and to a torsional-vibration damper having end shoes and/or slide shoes designed on the basis of such shoe.

2. Description of Related Art

EP 1 584 839 A1 discloses a torsional vibration damper having a drive-input-side primary element which has at least one primary driver and having a drive-output-side secondary element which has at least one secondary driver, which primary element and secondary element can be rotated relative to one another about a neutral position counter to at least one spring element which is provided between one of the primary drivers and one of the secondary drivers, and having end shoes arranged on the end sides of the spring elements, with at least one of the end shoes being designed such that, when a threshold relative rotational angle with respect to the neutral position is reached, at least one of the drivers comes into direct contact with the spring element, bypassing the at least one end shoe.

Torsional vibration dampers or rotary vibration dampers are known in different variations and from different applications. They are provided in particular in automotive engineering for elastically coupling the internal combustion engine and drivetrain. In this way, it is sought to prevent vibrations from being transmitted from the internal combustion engine to the drivetrain or gearbox. Such a transmission of vibrations occurs in motor vehicle drives in particular in the case of internal combustion engines with comparatively few cylinders and at low rotational speeds. Effective damping of such vibrations makes it possible for the internal combustion engine to be operated at relatively low rotational speeds, which generally entails a reduced fuel consumption and is therefore both economically and ecologically advantageous.

Torsional vibration dampers having a drive-input-side primary element and a drive-output-side secondary element which are coupled to one another by means of a spring device and which are rotatable with respect to one another to a limited extent about a rotational axis are known for example from EP 1 371 875 A1 or DE 195 22 718 A1. The primary element comprises a first driver which will also be referred to below as the primary driver. The secondary element comprises a second driver which will also be referred to below as the secondary driver. The torque is transmitted from the primary element by means of the primary driver firstly to the spring device and from there to the secondary driver of the secondary element.

The spring device is generally composed of one or more spring elements arranged in series in the circumferential direction of the torsional vibration damper, preferably helical springs or helical spring sets which are if appropriate connected to one another by means of slide shoes and are supported at both end sides by means of end shoes against the respective driver. If a transmission of torque takes place from the primary element to the secondary element, the described transmission of torque is referred to as traction. If, in contrast, the transmission of torque takes place in the opposite direction from the secondary element to the primary element, this is referred to as overrun.

It has been found that, in the event of a traction/overrun shift, in particular under low load conditions, a changeover noise can be heard. This can be attributed to the fact that, during the traction/overrun shift, the drivers of the primary and secondary elements abut against the end shoes which support the spring elements, and this can cause the changeover noise mentioned.

For this reason, in DE 101 33 694 A1, additional spring elements were provided between the end shoes and the drivers in order to reduce the abutment of these against one another and the associated generation of noise.

In contrast, in DE 199 58 814 A1, such additional spring elements are dispensed with and, instead, the end shoe which bears against the end side of the respective spring element is designed so as not to completely cover the end side of the spring element. Furthermore, the drivers are provided with an arm which is designed such that, in the event of an abutment of the driver and end shoe against one another, the arm of the driver firstly abuts directly against the spring element, bypassing the end shoe. In this way, the movement of the driver is initially damped slightly before the driver abuts over a large area against the end shoe, such that the abovementioned changeover noises can be reduced at least in the event of small torques to be transmitted. A disadvantage of the device is that the initial damping effect is not great enough if the driver is acted on with a high rotational impetus or a high torque. In this case, changeover noises are still generated as the driver abuts against the stop.

Generally known from EP 0 236 159 is a torsional vibration damper in which use is made of two differently-dimensioned types of springs, with the first of the springs being connected in each case alternately in series with the second of the springs.

DE 102 40 839 A1 discloses a torsional vibration damper in which, within the windings of a first spring, a second spring with a smaller outer diameter is inserted. Here, the second spring projects at the end side slightly out of the end side of the first spring. Here, the two springs are mounted in each case entirely within a common end stop, such that undesirable noises are generated in the event of an abutment of a driver.

DE 199 09 044 A1 describes a further arrangement of a torsional vibration damper of this type, with the second spring having, in its central section, a spring winding with an increased diameter, which spring winding engage between two adjacent spring windings of the first, outer spring and thereby fix the second spring in the first spring. In this arrangement, the second, inner spring is dimensioned so as to be harder than the outer spring. The two springs are again mounted at the end side on in each case one end stop or driver.

DE 100 19 873 A1 describes a torsional vibration damper having a multiplicity of springs which are mounted in slide shoes. Here, partially differently dimensioned first and second springs alternate in the circumferential direction.

DE 41 41 723 C2 describes a torsional vibration damper having an idling spring system. In this arrangement, too, differently dimensioned springs are inserted in the circumferential direction.

The problem on which the invention is based is that of proposing, in a simple manner, a shoe having a spring position limitation and having two springs which are arranged one inside the other, such that improved isolation and vibration damping can be realized. Furthermore, it is sought to propose a torsional vibration damper using a shoe of this type in the form of end shoes and/or slide shoes.

SUMMARY OF INVENTION

The present invention overcomes the disadvantages in the related art in a shoe that mounts an outer spring defining a longitudinal direction and an inner spring arranged within the outer spring. The outer and inner springs define corresponding end sides of the outer and inner springs, and the shoe defines an end side of the shoe. A spring-position limitation limits the outer spring in its longitudinal direction and enables the inner spring to emerge at the end side of the shoe out of the outer spring. A driver primary element exerts a pressure on the inner spring as the driver approaches the outer and inner springs in a direction of the corresponding end sides of the outer and inner springs.

It is preferable for the spring position limitation to form a spring rest surface for providing support facing toward that portion of the second, inner spring which projects out of the first, outer spring. In this way, a radial support of the second, inner spring when inserted in a torsional vibration damper is formed by the spring position limitation for the first spring.

The spring rest surface preferably has, for the second, inner spring, a curved profile with a radius of at least that of the outer circumference of the second, inner spring. In this way, the second, inner spring is not only provided with hold in the radial direction but is also provided with hold in the lateral direction with respect to the radial direction. The second, inner spring is preferably longer than the first, outer spring.

The second, inner spring advantageously has a smaller outer circumference than an inner circumference of the first, outer spring. In this way, the second, inner spring can be compressed by at least such a distance into the first, outer spring that the driver firstly pushes the second, inner spring into the first, outer spring before the driver compresses both the first, outer spring and the second, inner spring together.

The second, inner spring is preferably softer than the first, outer spring. Such dimensioning permits an initially particularly soft damping action which increases with progressive travel of the driver and experiences further, more intense damping upon abutment additionally against the first, outer spring. An abrupt braking or abutment of the driver against a spring arrangement having a uniform and abruptly increasing damping effect is thereby particularly advantageously avoided.

In a spring arrangement having one or more spring sets, at both end sides of the spring arrangement, the first, outer spring is preferably limited by spring position limitations and the second, inner spring preferably projects at both sides out of the end sides of the first, outer spring. In such an arrangement, additional slide shoes are if appropriate positioned in between in order to support such spring arrangements.

End-side ends of the second, inner spring or springs are preferably unloaded in a neutral position. In an idling position, therefore, those ends of the second, inner springs which project out of the end sides of the first springs are preferably not acted on with force, such that, with a change in a torque acting in the torsional vibration damper, soft damping can introduce a torque shift regardless of the torque direction. A retaining device advantageously fixes both the first, outer spring and the second, inner spring to the end shoe or slide shoe and relative to the same at a distance from the at least one spring position limitation.

Both the first, outer spring and the second, inner spring may be fixed to two slide shoes by means of two retaining devices which are at a distance from one another and from the spring ends of the springs, with the slide shoes being freely adjustable with respect to one another by means of a slide surface. Such an arrangement permits the arrangement of to arrange two springs and/or a plurality of spring sets with two outer springs designed in this way in particular a torsional vibration damper for an elongated damping path between two end shoes. Here, it is also Possible if appropriate for even the slide shoes to be designed as end shoes.

A further spring position limitation may advantageously be formed on the shoe to limit the end-side spring travel of the second, inner spring. Here, the further spring position limitation is preferably arranged, for the second, inner spring, on the spring rest surface of the spring position limitation for the first, outer spring.

The spring position limitation preferably has a continuous recess for allowing the driver to extend through against the end sides of the second, inner spring and the first, outer spring. This advantageously permits a limitation of the spring extent either for the first spring or for both springs, and nevertheless permits a low-noise or noise-preventing abutment of the driver which moves against the end sides of the springs. The first, outer spring preferably has play in its axial extent between the spring position limitation and a spring retaining device which is spaced apart therefrom, with the first, outer spring being supported on a spring rest surface.

The first, outer spring and the second, inner spring may be fixed to one another and/or to the shoe at different distances from the spring position limitation. This permits an optimum setting of the spring travels of the first and of the second spring, and also makes it possible for the entire spring arrangement to be optimally adapted to respective given conditions.

According to an independent advantageous embodiment, the travel of the first, outer spring is restricted by a spring position limitation while the travel for the extent of the second, inner spring is permitted over a longer extent, such that the second, inner spring can project at the end side out of the first, outer spring. Here, an embodiment is advantageous in which the spring position limitation for the first, outer spring is simultaneously formed as a spring support for the second, inner spring.

The torsional vibration damper is preferably provided with end shoes which are designed so as to also provide guidance for the spring elements, but so as not to come into direct contact with the associated driver at any time during the damping process; the driver rather instead always abuts directly preferably against the end side of the respective spring element. Here, the spring elements dampen the abutment movement of the driver, such that no changeover noises occur regardless of the rotational impetus of the driver.

One advantageous refinement of the invention consists in providing the at least one end shoe with at least one device which enables the end shoe to be fastened to the spring element. The device is preferably embodied as a retaining lug, by means of which windings of at least one helical spring of the associated spring element can be clamped. In this way, the end shoe is prevented from being released from the spring element during damping operation, which would cause the spring element to lose its guidance. If the spring element is composed of a plurality of different helical springs arranged one inside the other, it is possible in particular for fastening devices to be provided which connect the end shoe to different helical springs.

An end shoe of this type is optionally designed such that the at least one driver remains in direct contact with the spring element for as long as the threshold relative rotational angle is exceeded. The corresponding driver may alternatively or additionally also optionally be designed such that the at least one driver remains in direct contact with the spring element for as long as the threshold relative rotational angle is exceeded. Consequently, a transmission of torque always takes place from the driver to the spring element, in contrast to DE 199 58 814 A1, where a transmission of torque from the driver to the end shoe and from the end shoe to the spring element takes place above a threshold relative rotational angle.

What is preferable is a torsional vibration damper having shoes of this type, a drive-input-side primary element, which has at least one primary driver, and a drive-output-side secondary element, which has at least one secondary driver. The primary element and secondary element can be rotated relative to one another about a neutral position counter to at least one spring element that is provided between one of the primary drivers and one of the secondary drivers. The torsional vibration damper has also end shoes arranged on the end sides of the respective spring element. At least one of the end shoes is designed such that, when a threshold relative rotational angle with respect to the neutral position is reached, at least one of the drivers comes into direct contact with the spring element, bypassing the at least one end shoe. The at least one end shoe and/or the at least one driver is designed such that the at least one driver remains in direct contact with the spring element for as long as the threshold relative rotational angle is exceeded.

Other objects, features, and advantages of the present invention will be readily appreciated as the same becomes better understood while reading the subsequent description taken in conjunction with the accompanying drawings.

BRIEF DESCRIPTION OF EACH FIGURE OF DRAWING

Figure 2:
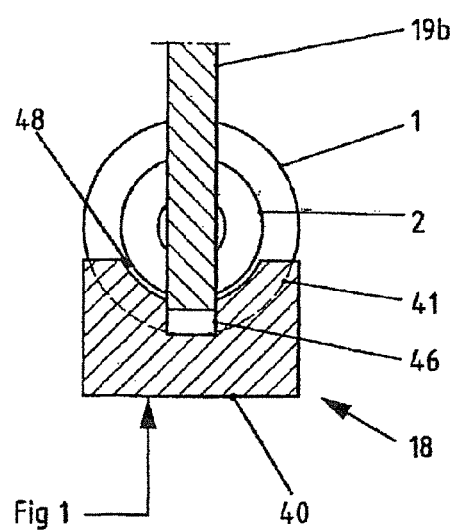
Figure 5A:
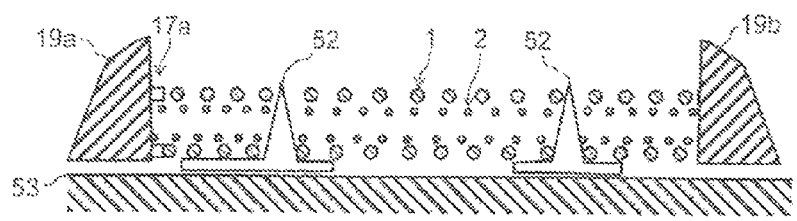
Figure 5B:
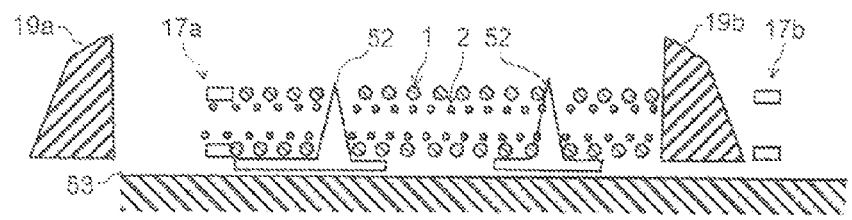
Figure 5C:
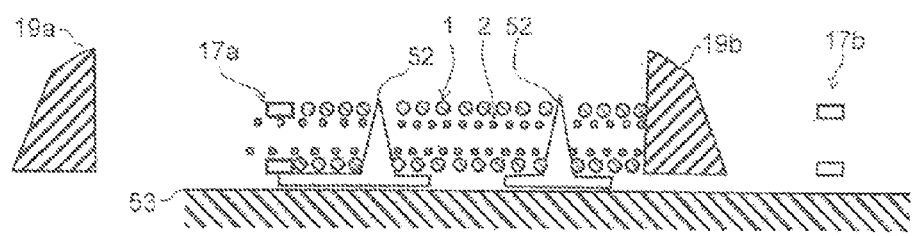
Figure 6:
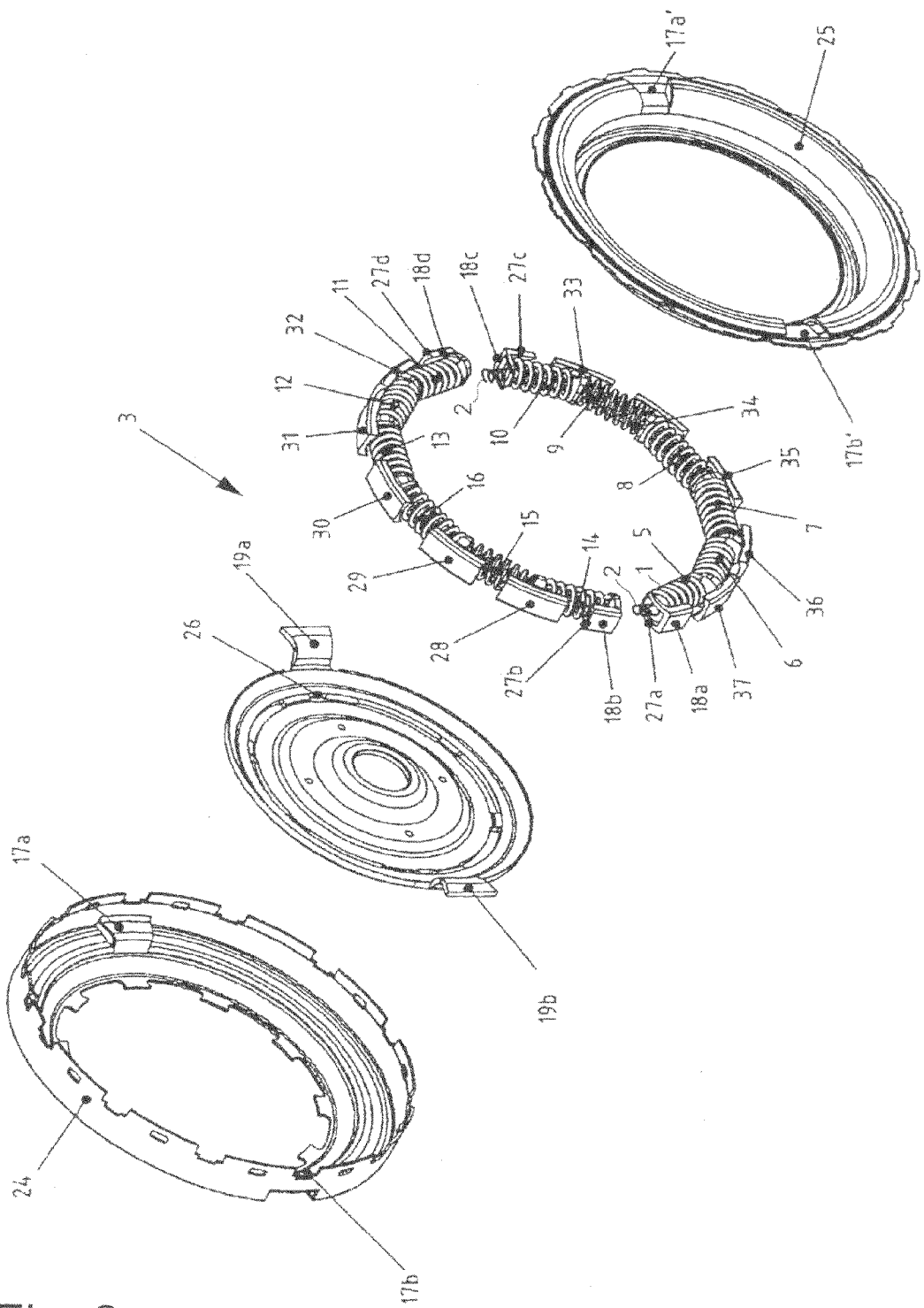
Figure 7:
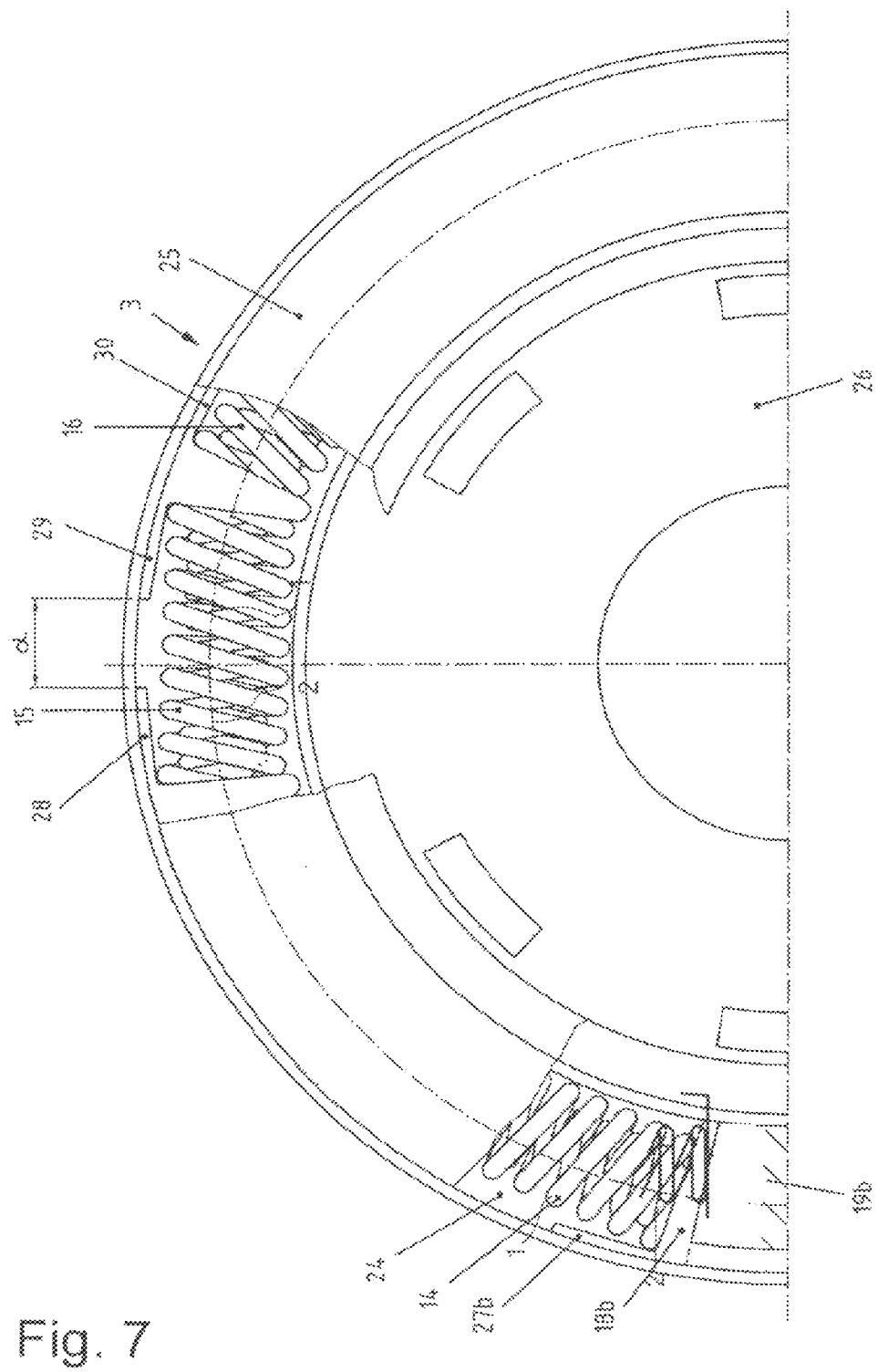

The invention will be explained in more detail below on the basis of figures. Identical or functionally identical components are provided with the same reference numerals in all the figures, in which:

FIG. 1 schematically shows a partially sectioned side view of a shoe for a torsional vibration damper in order to illustrate the basic principle, FIG. 2 shows the arrangement from FIG. 1 in a front view, FIG. 3 shows a side sectional view of an exemplary shoe within a torsional vibration damper, FIG. 4 shows a sectional view in the circumferential direction through a torsional vibration damper with a view of the end side of a shoe, FIG. 5a shows an illustration of the basic principle of another preferred embodiment of the torsional vibration damper of the present invention shown in its neutral position, FIG. 5b shOws an illustration of the basic principle of the embodiment of the torsional vibration damper illustrated in FIG. 5a shown under a slight tractive load, FIG. 5c shows an illustration of the basic principle of the embodiment of the torsional vibration damper illustrated in FIG. 5a shown under a full load, FIG. 6 shows the torsional vibration damper according to FIG. 1 in an exploded illustration, and FIG. 7 shows a detail of an exemplary torsional vibration damper having end shoes.

DETAILED DESCRIPTION OF INVENTION

FIGS. 6 and 7 illustrate a torsional vibration damper 3 having a primary element in the form of a central disk 26 and having a secondary element in the form of two side disks 24, 25 which are rotationally fixedly connected to one another. Spring elements composed of a plurality of spring sets 5, 6, 7, 8, 9, 10, 11, 12, 13, 14, 15, 16 are arranged around the central disk 26 in a cavity formed by the rear side disk 24 and by the front side disk 25. In the present exemplary embodiment, each of the spring sets 5, 6, 7, 8, 9, 10, 11, 12, 13, 14, 15, 16 is composed of two helical springs situated one inside the other; a first, outer spring 1 and a second, inner spring 2. The spring sets 5, 6, 7, 8, 9, 10 and 11, 12, 13, 14, 15, 16 respectively are arranged in series, so as to form in each case one spring element, by means of spacers, so-called slide shoes 28, 29, 30, 31, 32 and 33, 34, 35, 36, 37 respectively. An end shoe 18a, 18b, 18c, 18d is arranged on the respective end of a spring element.

The end surfaces of the end shoes 18a, 18b, 18c, 18d are seated, in a neutral position, in each case on a driver 17a, 17a'; 17b, 17b', which is formed in two parts here, of the secondary element 24, 25 which is composed of two side disks 24, 25. The end shoes 18a, 18b, 18c, 18d are of U-shaped design at their end sides. Here, the two limbs of the U-shape are seated in a substantially positively locking manner on the respective driver, composed of the two driver parts 17a, 17a' and 17b, 17b', of the secondary element.

The intermediate space between the two limbs of the U-shape of the respective end shoe 18a, 18b, 18c, 18d is selected to be precisely so large that the driver 19b of the primary element 26, in the event of a relative rotation between the primary and secondary elements 24, 25, 26 in one rotational direction, abuts directly against the spring set 14 without coming into contact with the end shoe 18b. At the same time, the driver 19a of the primary element 26 abuts directly against the spring set 10 without coming into contact with the end shoe 18c.

In the event of a relative rotation between the primary and secondary elements 24, 25, 26 in the other rotational direction, the driver 19b of the primary element 26 abuts directly against the spring set 5 without coming into contact with the end shoe 18a. At the same time, the driver 19a of the primary element 26 abuts against the spring set 11 without coming into contact with the end shoe 18d. This measure serves to prevent the generation of changeover noises.

It can also be seen from the drawing that the respective end shoes 18a, 18b, 18c, 18d have, on the outer circumference, slide surfaces 27a, 27b, 27c, 27d which are supported against the inner wall of a cylindrical region of one of the side disks 24 (or 25). The slide shoes 28, 29, 30, 31, 32, 33, 34, 35, 36, 37 are also designed in the same way as the end shoes 18a, 18b, 18c, 18d. The slide shoes 28, 29, 30, 31, 32, 33, 34, 35, 36, 37 are also supported at the outer circumference against the inner wall of the cylinder of the corresponding side disk 24 (or 25).

The slide surfaces 27a, 27b, 27c, 27d of the end shoes 18a, 18b, 18c, 18d and the slide surfaces, which are not provided with reference symbols, of the slide shoes 28, 29, 30, 31, 32, 33, 34, 35, 36, 37 firstly ensure that the spring sets 5, 6, 7, 8, 9, 10, 11, 12, 13, 14, 15, 16 are compressed with low friction and without misalignment when the primary and secondary elements 24, 25, 26 are rotated with respect to one another. Furthermore, in the present exemplary embodiment, the circumferential extent of the end shoes 18a, 18b, 18c, 18d and of the slide shoes 28, 29, 30, 31, 32, 33, 34, 35, 36, 37 is dimensioned such that their end surfaces which face toward one another come into abutting contact before the individual helical springs of the spring sets 5, 6, 7, 8, 9, 10, 11, 12, 13, 14, 15, 16 reach the blocked state. The end shoes 18a, 18b, 18c, 18d and the slide shoes 28, 29, 30, 31, 32, 33, 34, 35, 36, 37 therefore define the maximum compression α of the spring sets 5, 6, 7, 8, 9, 10, 11, 12, 13, 14, 15, 16. This measure serves to prevent the helical springs from being destroyed at high torques.

FIGS. 1 and 2 show a particularly preferred embodiment of an exemplary end shoe 18. Reference symbols which have been described with regard to the embodiment described above will not be explained in any more detail below; reference is made to the statements made above.

The exemplary end shoe 18 has a shoe body 40 which has a spring rest surface 41 on the upper side, which spring rest surface 41 serves to laterally mount and radially support the first, outer spring 1. Here, the spring rest surface 41 may preferably have a curvature corresponding to the outer curvature of the first, outer spring 1. In a preferably end-side region, a spring position limitation 42 is fastened to or formed in one piece with the shoe body 40. The spring position limitation 42 projects away from the spring rest surface 41 in the direction of the upper side, that is to say in the direction of the first, outer spring 1 which lies thereon, to such an extent that the spring position limitation 42 forms an end-side stop for the first, outer spring 1. Here, a height h of the spring position limitation 42 for the first, outer spring 1 is selected such that the second, inner spring 2 can project out of the first end side 43, which bears against the spring position limitation 42, of the first, outer spring and, with its end side 44 of the second, inner spring 2, is not limited by the spring position limitation 42 for the first spring.

The shoe body 40 may optionally also additionally have, at the outer side or end side, a further spring position limitation 45 for the second, inner spring 2. In this way, the latter is also limited at the end side and can extend with its first end side 44 only up to the further spring position limitation 45.

Both the spring position limitation 42 for the first, outer spring 1 and also the further spring position limitation 45 for the second, inner spring 2 have a recess 46 which extends all the way through the body of the spring position limitations 42, 45 and enables a driver 19b to press against the end sides 44, 43 of the second, inner spring 2 and preferably also of the first, outer spring 1 through the recess 46. By means of such a design, in which the second, inner spring 2 projects at the end side out of the first, outer spring 1, the driver 19b presses firstly against the first end side 44 of the second, inner spring 2 and only subsequently against the first end side 43 of the first, outer spring 1. This generates an initially lightly damped braking of the driver 19b and a more intense braking of the driver 19b only at a later time, or from the point of view of a slidable end shoe 18, firstly a slow acceleration and then an increasing acceleration. At the rear side, or in a central section, the end shoe 18 has a spring retaining device 47 which projects therefrom in the direction of the springs, which spring retaining device 47, for example as a mandrel-like projection, is guided between individual windings of the first, outer spring 1 and the second, inner spring 2. In this way, the two springs 1, 2 are connected to the end shoe 18 in an immovable fashion in the region of the spring retaining device 47. The springs 1, 2 may however also be merely supported at the rear side by the spring retaining device 47.

The two springs 1, 2 may be configured individually depending on the desired action and desired field of use. It is particularly preferable to use a soft second, inner spring 2 in relation to a relatively hard first, outer spring 1. In principle, however, the spring parameters may be selected to be identical or even reversed. Instead of the second, inner spring 2 likewise being fixed to the end shoe 18 by means of the spring retaining device 47 at the same position as the first, outer spring 1, the second, inner spring 2 may also be fixed relative to the first, outer spring 1 at some other position. In such a case, it is for example possible for a winding of the second, inner spring 2 with a relatively large circumference to engage between corresponding windings of the first, outer spring 1.

According to further embodiments, the second, inner spring 2 may project not only out of the first end side 43 of the first, outer spring 1 but rather also out of the opposite, second end side of the first, outer spring 1. Such an embodiment may in particular be provided not only in the form of an end shoe 18 but rather also in the form of a slide shoe 28. The surface of the spring position limitation 42 for the first spring 1 is preferably formed with a surface curvature corresponding to the outer circumference of the second, inner spring 2, such that the surface forms a spring rest surface 48 for the second, inner spring 2.

FIG. 3 shows an example of a slide shoe 50 which is inserted in a torsional vibration damper. Again, the first end side 44 of the second, inner spring 2 projects out of the first end side 43 of the first, outer spring 1. At the opposite end, both springs 1, 2 bear against a spring retaining device 47 which serves to limit the springs 1, 2. In this embodiment, only a spring position limitation 42 for the first, outer spring 1 is arranged on a shoe body 40. The exemplary slide shoe 50 has a slide surface 53 which corresponds to a curved profile corresponding to the curvature of the corresponding inner guide surface of a secondary element 25. The illustration of FIG. 3 also shows axial openings 54 in the side disk.

FIG. 4 shows a section through the torsional vibration damper illustrated in FIG. 3 along the line "A-A." FIG. 5 shows, in a side view, an operating principle of a first, outer spring 1 and of a second, inner spring 2 which are mounted by means of two slide shoes 52 on a slide surface 53. Here, an independent spring set composed of an outer and an inner spring, or if appropriate also only a single individual spring, may be arranged between the two slide shoes 52. In such a case, separate spring sets composed of a first, outer spring 1 and a second, inner spring 2 are arranged at the outsides of the two slide shoes 52, with the two second, inner springs 2 projecting at the end side out of the first, outer springs in an unloaded position.

For exerting a load on the outer end sides, drivers 19a, 19b are also depicted which are arranged with a constant spacing with respect to one another and which, in a neutral position, bear against the two outer end sides of the arrangement of springs 1, 2. Here, the two second, inner springs 2 preferably project slightly out of the end sides of the two first, outer springs 1, as depicted in the uppermost illustration. The first, outer springs 1 are situated between the driver secondary elements 17a, 17b. The central illustration illustrates the situation of slight tractive load, in which the driver 19b depicted at the right-hand side exerts a compressive force on the outer end side of the second, inner spring 2, which compressive force is then ultimately transmitted to the entire spring arrangements and slide shoes 52 and to the drivers 17a, 17b of the secondary element. On the opposite side of the arrangement, at which the opposite, second driver 19a moves away from the spring arrangement, the outer spring 1 is supported at the end side against the driver 17a of the secondary element, and the inner spring 2 protrudes, unloaded, through the driver 17a of the secondary element. The lower figure depicts the situation of full load, in which both the end side of the second, inner spring 2 and also the end side of the first, outer spring 1 are acted on with force by the driver 19b arranged at the right-hand side. Such a mode of operation can be used not only in a torsional vibration damper with a correspondingly curved slide surface, but rather in principle also in situations with a planar slide surface 53, as depicted in FIG. 5.

A shoe according to the above embodiments is therefore preferably designed in particular as a slide shoe (skate) with an inner spring rest and spring position limitation. Here, the shoe serves to provide support and to deflect spring forces.

In a torsional vibration damper in particular, the shoe geometry is selected such that the unloaded first, outer spring 1, in its free length, is inserted in the shoe with slight play between the spring retaining device 47 and the spring position limitation 42. In this way, slipping out can be prevented, such that the spring 1 does not move away from the shoe in the circumferential direction. Here, the circumferential direction is to be understood to mean a tangential or concentric direction about a central rotational axis of the torsional vibration damper.

The second, inner spring 2 which projects in the circumferential direction is preferably longer, in the unloaded state, than the first, outer spring 1. The second, inner spring 2 which projects at the end side out of the first, outer spring 1 can be supported or can rest with its projecting section preferably on the spring position limitation 42 for the first, outer spring 1. It is optionally possible for a further spring position limitation 45 for the second, inner spring 2 to be formed on the shoe, for example on the end shoe 18. The spring position limitations 42, 45 have a cutout or recess 46 which is dimensioned so as to enable the driver 19b or a portion, which projects from the driver 19b in the direction of the end sides 43, 44 of the springs 1, 2, to pass through. In this way, a flange vane of a driver 19b of this type can pass, during its rotational movement, through the spring position limitation 42, 45 and thereby actuate firstly the relatively long second, inner spring 2 and subsequently the second, inner spring 2 and the first, outer spring 1. The second, inner spring 2 preferably has a lower spring rate than the first, outer spring 1.

The dimensions of the shoe in the form of an end shoe 18 or slide shoe and the dimensions of the primary element and secondary element are preferably coordinated with one another in such a way that the shoe, with its spring position limitation, can pass the stops of the primary element and/or of the secondary element without making contact. The flange vane or driver 19b is preferably narrower than the corresponding spring stops in the primary and secondary masses.

Embodiments with different dimensions and arrangements are alternatively possible. For example, in the event of the first, outer spring and the second, inner spring being of approximately equal length in the unloaded state, the shoe may also be formed with only the spring position limitation, with a radial spring support being dispensed with.

As well as permitting a neutral position, such an arrangement also permits, in advantageous embodiments, in particular low-load states and load shift transitions, as is also depicted in FIG. 5. In the low-load states, in which only the second, inner springs 2 of a torsional vibration damper are actuated, improved isolation or vibration damping is realized by means of the "soft" inner spring with, for example, a low pitch. The transition torque at which the driver moves from abutting against only the second, inner spring 2 to also abutting against the first, outer spring 1 can be adapted correspondingly to the desired behavior. In particular, since it is possible for the inner springs which are seated in the end springs to protrude through the spring stops, any possibly occurring noise which could be caused by the abutment of the spring against the spring stops is reduced in certain situations.

In the case of an arrangement of a slide shoe with an inner spring rest and spring position limitation in the form of the spring position limitation 42 for the first, outer spring 1 according to FIG. 1 both on the traction side and also on the overrun side, a functional advantage is obtained for the overrun. In traction without preload, that is to say without spring actuation, the second, inner spring 2 of the overrun-side slide shoe is pushed between the stops of the primary and secondary masses of the torsional vibration damper. During the subsequent shift to overrun, the overrun-side actuated second, inner spring, which projects in the unloaded state, is very soft and can perform an isolation or damping function in an unhindered manner.

At idle or in the neutral position (FIG. 5), the flange vane or driver can oscillate between the two soft second, inner springs 2 of the end spring pack. In this way, it is possible to realize improved isolation or vibration damping. Since the unloaded springs are placed between two limiting contours in the slide shoe or end shoe, that is to say between a slide shoe wedge in the form of a spring retaining device 47 and a spring position limitation 42, 45, the springs 1, 2 cannot slip out of the slide shoe or end shoe 18 in the circumferential direction.

The end shoe may optionally be formed with stop lugs as the spring position limitation, which stop lugs form abutment points for the end surface of the associated spring element. The stop lugs prevent the spring element from sliding forward with its end side through the end surface of the end shoe, and prevent the spring element from thereby losing its guidance.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A shoe for mounting an outer spring (1) defining a longitudinal direction and an inner spring (2) arranged within said outer spring (1), said shoe comprising:
    a shoe body (40);
    at least one retaining device (47) extending from said shoe body (40) for limiting one end side of said outer spring (1) and said inner spring (2) in said longitudinal direction; and
    a spring-position limitation (42) extending from said shoe body (40) and spaced at a distance from said at least one retaining device (47) for limiting another end side (43) of said outer spring (1) in said longitudinal direction and enabling an end side (44) of said inner spring (2) to emerge from said shoe body out of said outer spring (1) such that
    a driver primary element (19a; 19b) exerts a pressure first on said inner spring (2) as the driver primary element (19a; 19b) approaches said outer and inner springs (1, 2) in a direction of the corresponding end sides (43, 44) of said outer and inner springs (1, 2).

2. A shoe as set forth in claim 1, wherein said spring-position limitation (42) forms a spring-rest surface (48) for providing support for and facing toward a portion of said inner spring (2) that projects out of said outer spring (1).

3. A shoe as set forth in claim 2, wherein said spring-rest surface (48) has a curved profile with a radius of at least a radius of an outer circumference of said inner spring(2).

4. A shoe as set forth in claim 3, wherein said outer circumference of said inner spring (2) is smaller than an inner circumference of said outer spring (1).

5. A shoe as set forth in claim 1, wherein said inner spring (2) is longer than said outer spring (1).

6. A shoe as set forth in claim 1, wherein said inner spring (2) is softer than said outer spring (1).

7. A shoe as set forth in claim 1, wherein, in a spring arrangement having at least one spring set (5-16) and at least one end side of said spring set (5-16), said outer spring (1) is limited by said spring-position limitation (42) and said inner spring (2) projects out of the end side (43) of said outer spring (1).

8. A shoe as set forth in claim 1, wherein ends of the end side (44) of said inner spring (2) are unloaded in a neutral position.

9. A shoe as set forth in claim 1, wherein, said at least one retaining device (47) fixes said outer spring (1) and inner spring (2) to either of an end shoe (18) and a slide shoe (28-37; 50) and at a distance from said spring-position limitation (42).

10. A shoe as set forth in claim 9, wherein said outer spring (1) and inner spring (2) are fixed to said slide shoe (28-37; 50) by a pair of said retaining devices that are at a distance from one another and ends of said outer and inner springs (1, 2) with said slide shoe (28-37; 50) being freely adjustable with respect to one another by a slide surface (53).

11. A shoe as set forth in claim 9, wherein a further spring-position limitation (45) limits travel of the end side (44) of said inner spring (2).

12. A shoe as set forth in claim 11, wherein said further spring-position limitation (45) is arranged on a spring-rest surface (41) of said spring-position limitation (42) for said outer spring (1).

13. A shoe as set forth in claim 12, wherein said outer spring (1) has play in an axial extent of said outer spring (1) between said spring-position limitation (42) and retaining device (47), which is spaced apart from said spring-position limitation (42), and is supported on said spring-rest surface (41).

14. A shoe as set forth in claim 11, wherein said spring-position limitations (42, 45) have a continuous recess (46) for allowing said driver primary element (19a; 19b) to extend through and against the corresponding end sides (44, 43) of said inner spring (2) and outer spring (1).

15. A shoe as set forth in claim 1, wherein said outer spring (1) and inner spring (2) are fixed to at least one of each other and said shoe at different distances from said spring-position limitation (42).

16. A torsional-vibration damper (3) having at least one shoe for mounting an outer spring (1) defining a longitudinal direction and an inner spring (2) arranged within said outer spring (1), said shoe comprising:
a shoe body (40);
at least one retaining device (47) extending from said shoe body (40) for limiting one end side of said outer spring (1) and said inner spring (2) in said longitudinal direction; and
a spring-position limitation (42) extending from said shoe body (40) and spaced at a distance from said at least one retaining device (47) for limiting another end side (43) of said outer spring (1) in said longitudinal direction and enabling an end side (44) of said inner spring (2) to emerge from said shoe body out of said outer spring (1) such that
a driver primary element (19a-19b) exerts a pressure first on said inner spring (2) as the driver primary element (19a; 19b) approaches said outer and inner springs (1, 2) in a direction of the corresponding end sides (43, 44) of said outer and inner springs (1, 2).

17. A torsional-vibration damper (3) as set forth in claim 16, wherein said spring-position limitation (42) forms a spring-rest surface (48) for providing support for and facing toward a portion of said inner spring (2) that projects out of said outer spring (1).

18. A torsional-vibration damper (3) as set forth in claim 17, wherein said spring-rest surface (48) has a curved profile with a radius of at least a radius of an outer circumference of said inner spring (2).

19. A torsional-vibration damper (3) as set forth in claim 18, wherein said outer circumference of said inner spring (2) is smaller than an inner circumference of said outer spring (1).

20. A torsional-vibration damper (3) as set forth in claim 16, wherein said inner spring (2) is longer than said outer spring (1).

* * * * *